(12) United States Patent
Wu

(10) Patent No.: US 9,383,030 B2
(45) Date of Patent: Jul. 5, 2016

(54) CHECK VALVE

(71) Applicant: Hsuan-Lung Wu, Taichung (TW)

(72) Inventor: Hsuan-Lung Wu, Taichung (TW)

(*) Notice: Subject to any disclaimer, the term of this patent is extended or adjusted under 35 U.S.C. 154(b) by 85 days.

(21) Appl. No.: 14/132,029

(22) Filed: Dec. 18, 2013

(65) Prior Publication Data

US 2015/0167860 A1   Jun. 18, 2015

(51) Int. Cl.
  *F16K 31/12*   (2006.01)
  *F16K 31/122*  (2006.01)
  *F16K 15/04*   (2006.01)

(52) U.S. Cl.
  CPC ............ *F16K 31/1228* (2013.01); *F16K 15/044* (2013.01); *F16K 31/122* (2013.01); *Y10T 137/7759* (2015.04); *Y10T 137/7787* (2015.04); *Y10T 137/7866* (2015.04); *Y10T 137/7927* (2015.04)

(58) Field of Classification Search
  CPC ............ Y10T 37/7866; Y10T 37/7867; Y10T 37/7868; Y10T 37/7912; Y10T 37/7787
  USPC ................. 137/539; 251/332, 334, 63.4, 63.5
  See application file for complete search history.

(56) References Cited

U.S. PATENT DOCUMENTS

| | | | | |
|---|---|---|---|---|
| 2,929,401 A * | 3/1960 | Cowan | ...................... | F16K 1/46 137/516.29 |
| 2,994,340 A * | 8/1961 | Biello | ................... | F16K 15/063 137/516.29 |
| 3,548,869 A * | 12/1970 | Anderson, Jr. | ......... | F16K 15/044 137/516.25 |
| 3,620,653 A * | 11/1971 | Gaylord | .............. | F04B 53/1002 137/515.5 |
| 3,854,557 A * | 12/1974 | Wilcox | ..................... | 188/322.15 |
| 3,894,556 A * | 7/1975 | Pareja | ............................ | 137/539 |
| 4,286,622 A * | 9/1981 | Ninomiya | ............... | F16K 15/04 137/516.29 |
| 4,347,915 A * | 9/1982 | Cooper | ................... | F16N 21/02 137/539 |
| 4,655,251 A * | 4/1987 | Nimberger | ................ | F16K 1/14 137/516.25 |
| 4,700,741 A * | 10/1987 | Murphy | ................ | F16K 15/044 137/539 |
| 5,575,767 A * | 11/1996 | Stevens | ......................... | 604/505 |
| 6,668,859 B1 * | 12/2003 | Wu | ............................... | 137/580 |
| 2006/0169332 A1 * | 8/2006 | Ikegawa | ......................... | 137/539 |
| 2012/0013080 A1 * | 1/2012 | Wu | ............................. | 279/4.11 |

* cited by examiner

*Primary Examiner* — R. K. Arundale
(74) *Attorney, Agent, or Firm* — The Mueller Law Office, P.C.

(57) ABSTRACT

A check valve includes a tubular casing, an abutment member, a valve member and a resilient member. The abutment member is flexible, is disposed in the tubular casing, and defines a central opening interconnecting first and second spaces that are defined in the tubular casing. The valve member is disposed in the tubular casing and is movable between a blocked position where the valve member blocks the central opening to isolate the first space from the second space, and an unblocked position where the valve member is spaced apart from the abutment member such that the first and second spaces communicate with each other. The resilient member is mounted to the tubular casing and biases the valve member toward the blocked position.

4 Claims, 4 Drawing Sheets

CHECK VALVE

BACKGROUND OF THE INVENTION

1. Field of the Invention

The invention relates to a check valve, more particularly to a check valve used in a hydraulic system of a chuck of a machine tool.

2. Description of the Related Art

Referring to FIG. 1, conventional check valves 4, 5 disclosed in Taiwanese Patent Application Publication No. 201130596 are used in a hydraulic system of a chuck of a machine tool. Referring further to FIG. 2, each of the conventional check valves 4, 5 includes a casing 401, 501, a valve member 402, 502 disposed movably in the casing 401, 501, and a resilient member 403, 503 biasing the valve member 402, 502 to block a port 404, 504 defined in the casing 401, 501. By virtue of the conventional check valves 4, 5, the chuck is operable to hold firmly a workpiece (not shown).

Since the casing 401, 501 and the valve member 402, 502 are made of rigid materials (e.g., metal), the valve member 402, 502 may not block the port 404, 504 completely unless they are precisely fitted. However, precision machining of the valve member 402, 502 and the port 404, 504 is costly and time-consuming.

SUMMARY OF THE INVENTION

Therefore, the object of the present invention is to provide a check valve for alleviating the drawbacks associated with the prior art.

Accordingly, a check valve of the present invention includes a tubular casing, an abutment member, a valve member and a resilient member. The tubular casing extends along an axis and has a first inner surrounding surface that surrounds the axis and that defines a first space therein, a second inner surrounding surface that surrounds the axis and that defines a second space therein, and an annular first shoulder surface that interconnects the first and second inner surrounding surfaces. The abutment member is made of a flexible material and has an annular section that clings to the first shoulder surface and that defines a central opening interconnecting the first and second spaces. The valve member is disposed in the tubular casing and is movable along the axis between a blocked position where the valve member blocks the central opening of the abutment member to isolate the first space from the second space, and an unblocked position where the valve member is spaced apart from the abutment member and is retained in the first space such that the first and second spaces communicate fluidly with each other. The resilient member is mounted to the tubular casing and biases resiliently the valve member toward the blocked position.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
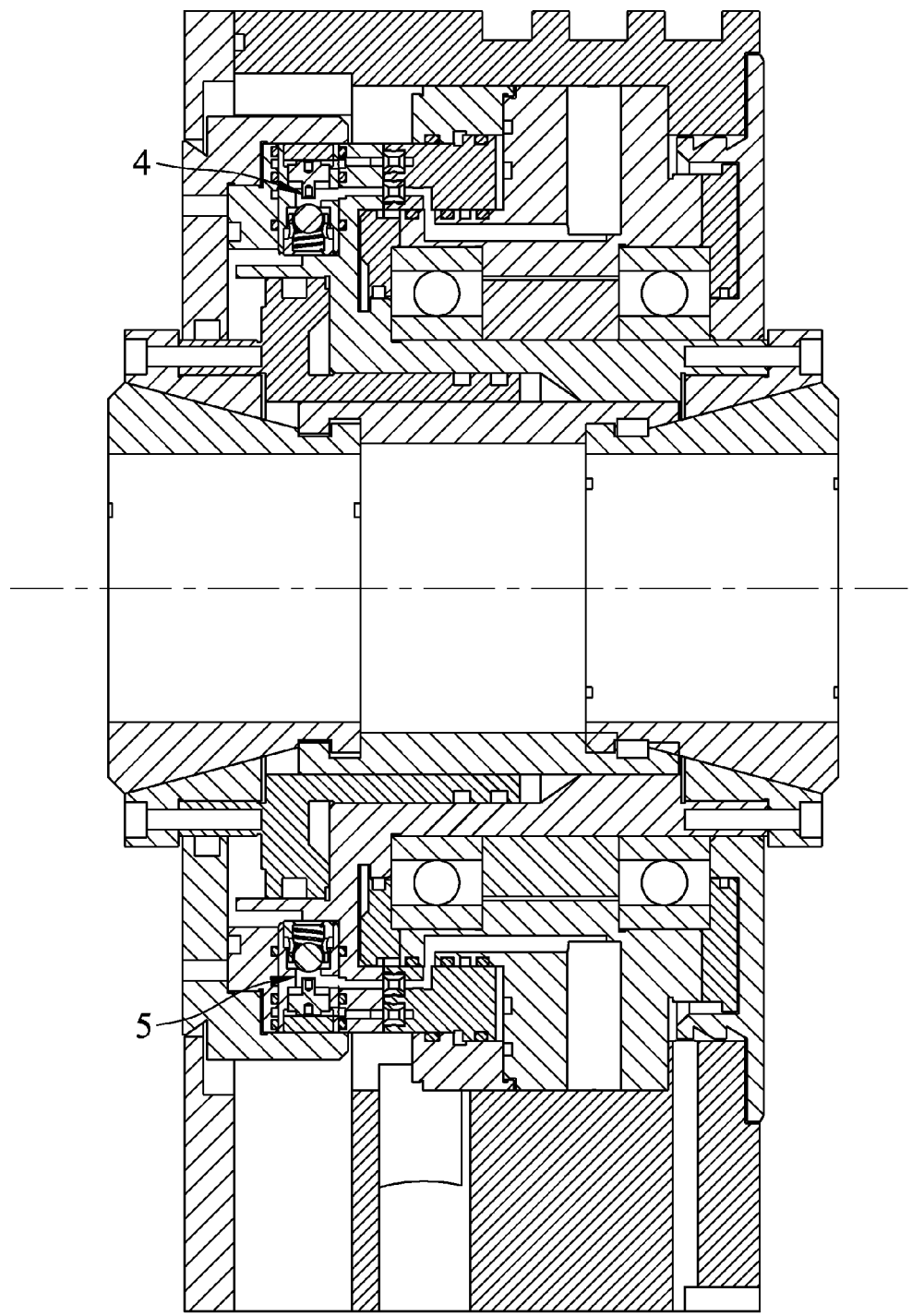
FIG. 1 is a sectional view of a chuck of a machine tool including two conventional check valves.
Figure 2:
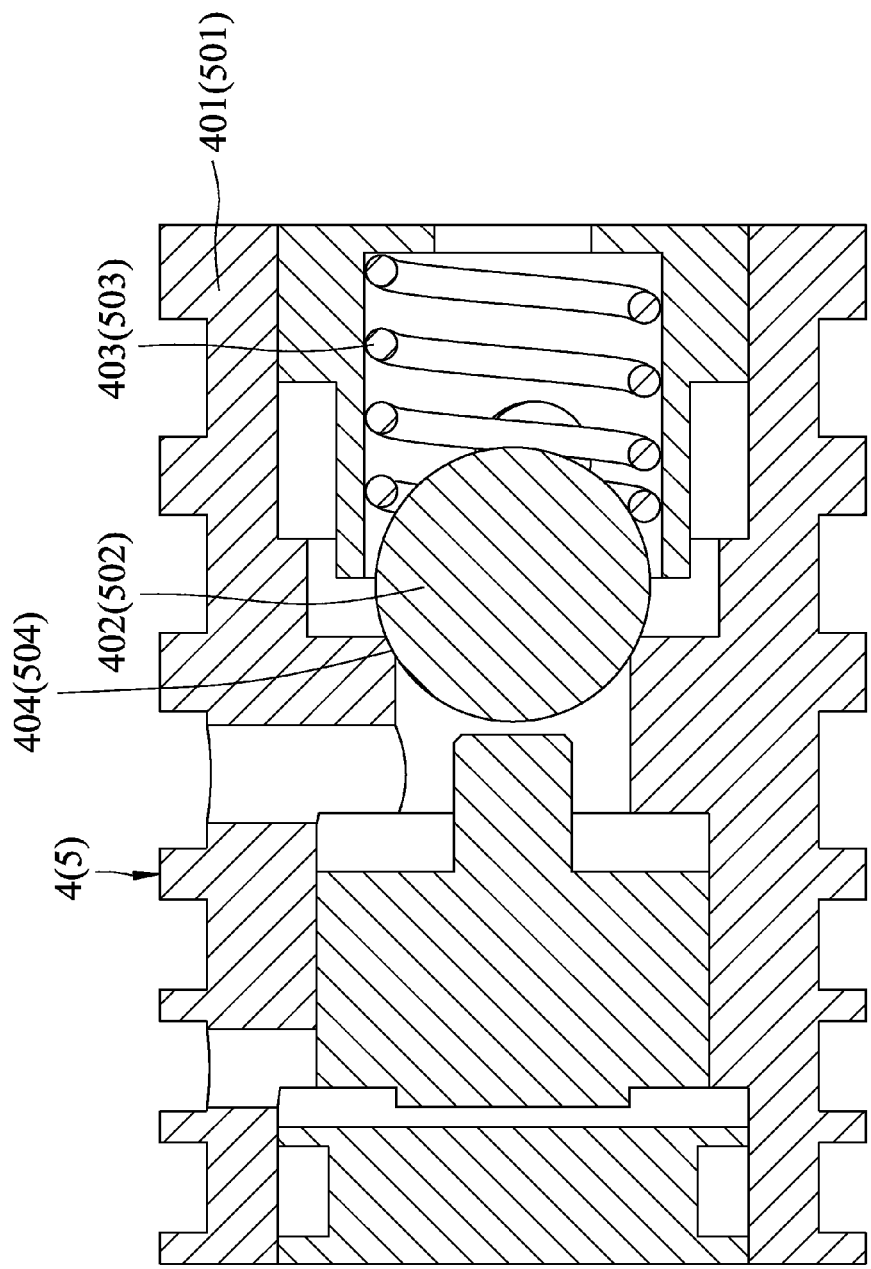
FIG. 2 is a sectional view of one of the conventional check valves.
Figure 3:
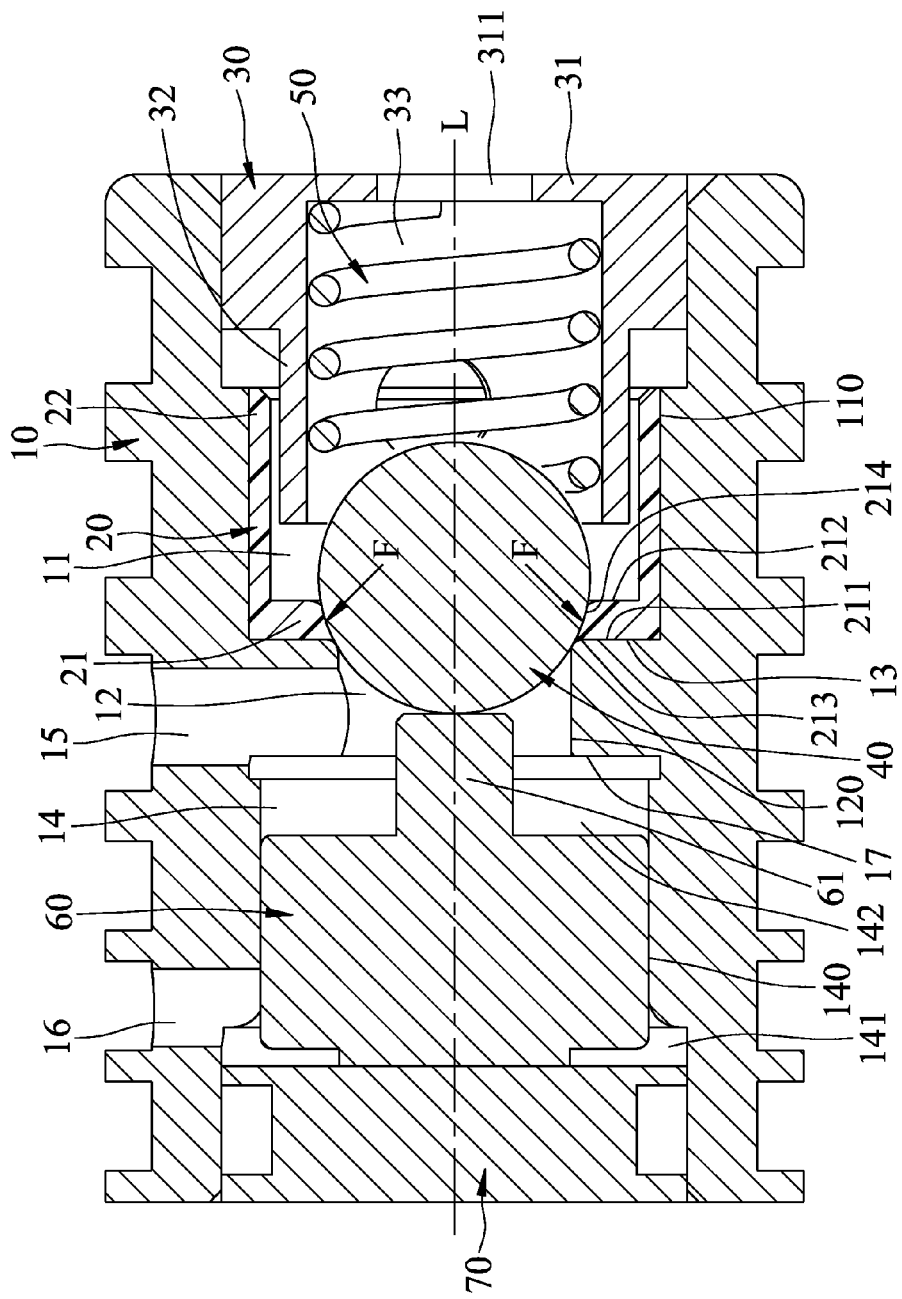
FIG. 3 is a sectional view of a preferred embodiment of a check valve according to the invention, illustrating a valve member in a blocked position.

As shown in FIG. 3, the preferred embodiment of a check valve according to the present invention is adapted for use in a hydraulic system of a chuck of a machine tool (not shown), and includes a tubular casing 10, an abutment member 20, an inner tubular piece 30, a valve member 40, a resilient member 50, a piston member 60 and an end piece 70.

The tubular casing 10 extends along an axis (L) and has first, second and third inner surrounding surfaces 110, 120, 140 and annular first and second shoulder surfaces 13, 17. The first inner surrounding surface 110 surrounds the axis (L) and defines a first space 11 therein. The second inner surrounding surface 120 surrounds the axis (L) and defines a second space 12 therein. The first shoulder surface 13 interconnects the first and second inner surrounding surfaces 110, 120. The third inner surrounding surface 140 is disposed at a side of the second inner surrounding surface 120 opposite to the first inner surrounding surface 110 along the axis (L), surrounds the axis (L), and defines a third space 14 therein. The second shoulder surface 17 interconnects the second and third inner surrounding surfaces 120, 140. The second space 12 has a diameter smaller than those of the first and third spaces 11, 14.

The abutment member 20 is made of a flexible material (e.g., rubber), is disposed in the tubular casing 10, and has an annular section 21 and a tubular section 22. The annular section 21 has a first end surface 211 that clings to the first shoulder surface 13, a second end surface 212 that is opposite to the first end surface 211, and an opening-defining surface 214 that defines a central opening 213 extending through the first and second end surfaces 211, 212 and interconnecting the first and second spaces 11, 12. The tubular section 22 is connected to the annular section 21, and clings to the first inner surrounding surface 110.

The inner tubular piece 30 is disposed in the first space 11, and has an end wall 31 and a tubular wall 32. The end wall 31 is connected fixedly to an end of the first inner surrounding surface 110 distal from the second space 12, and is formed with an outlet through hole 311 communicating with the first space 11. The tubular wall 32 extends from the end wall 31 toward the second space 12 along the axis (L), and is surrounded by the tubular section 22 of the abutment member 20.

Figure 4:
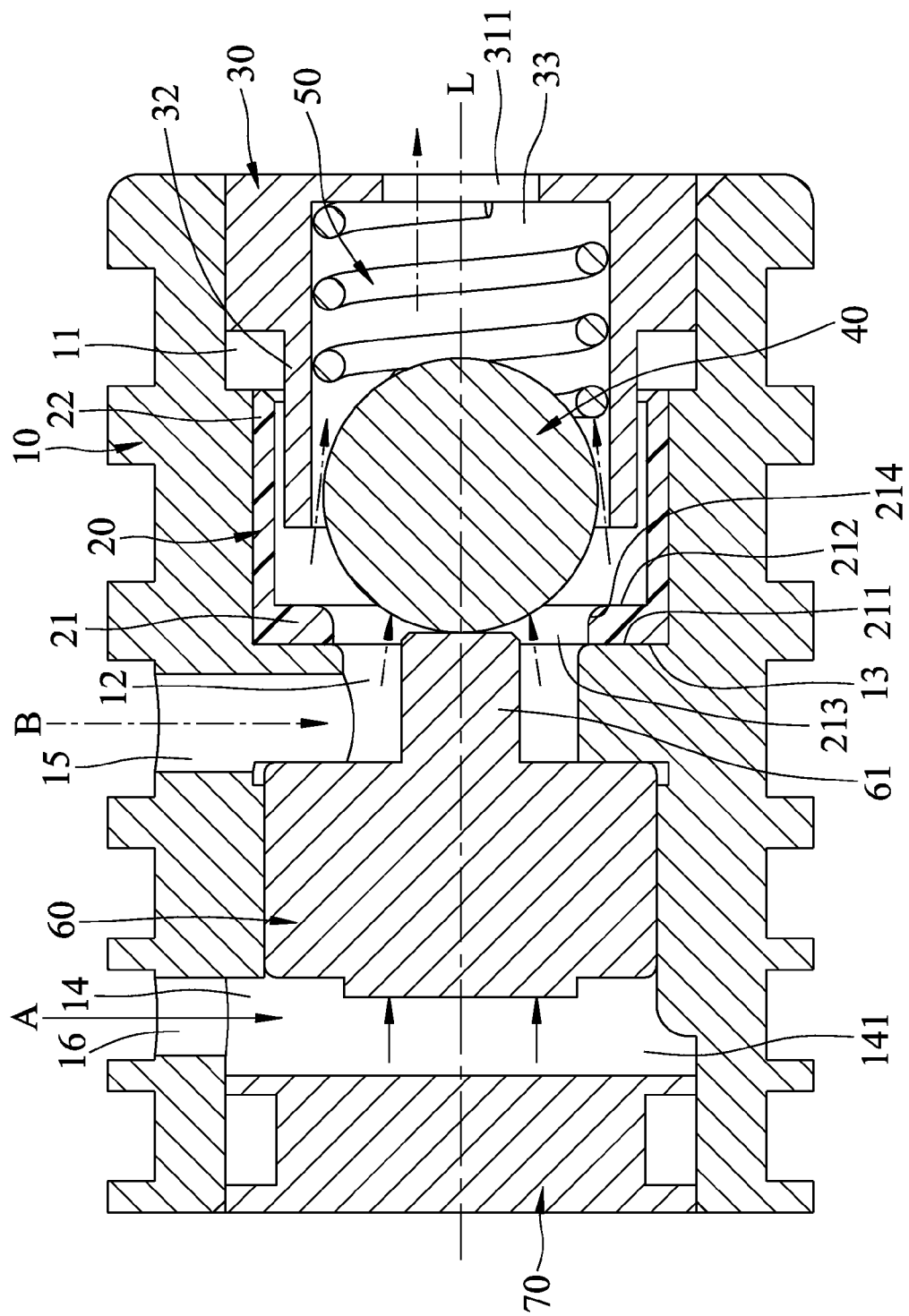
FIG. 4 is another sectional view of the preferred embodiment, illustrating the valve member in an unblocked position.

The valve member 40 is disposed in the tubular casing 10 and movable along the axis (L) between a blocked position (see FIG. 3) and an unblocked position (see FIG. 4). The valve member 40 blocks the central opening 213 of the abutment member 20 to isolate the first space 11 from the second space 12 when being at the blocked position. The valve member 40 is spaced apart from the abutment member 20 and is retracted into the tubular wall 32 (i.e., the valve member 40 is retained in the first space 11) when being at the unblocked position, such that the first and second spaces 11, 12 communicate fluidly with each other. The opening-defining surface 214 has an annular surface portion that contacts the valve member 40 when the valve member 40 is at the blocked position and that converges toward the second space 12.

The resilient member 50 is configured as a compression spring, is disposed in the tubular wall 32 of the inner tubular piece 30, and is connected between the valve member 40 and the end wall 31 of the inner tubular piece 30. The resilient member 50 biases resiliently the valve member 40 toward the blocked position.

The end piece 70 is connected fixedly to an end of the third inner surrounding surface 140 distal from the second space 12 for sealing up a distal end of the third space 14.

The piston member 60 is disposed in the tubular casing 10 and divides the third space 14 into a driving space portion 141 and a communicating space portion 142 that is isolated from the driving space portion 141. The driving space portion 141 is defined between the end piece 70 and the piston member 60. The communicating space portion 142 is defined between the piston member 60 and the second space 12 and communicates fluidly with the second space 12. The piston member 60 is movable along the axis (L) and has a rod portion 61 that extends through the second space 12 toward the first space 11 to contact the valve member 40.

The tubular casing 10 further has an inlet through hole 15 that extends radially from the second space 12 through a wall segment of the tubular casing 10, and a driving through hole 16 that extends radially from the driving space portion 141 of the third space 14 through another wall segment of the tubular casing 10.

Referring to FIG. 4, when a hydraulic fluid (A) of the hydraulic system enters the driving space portion 141 via the driving through hole 16, the piston member 60 is propelled toward the first space 11 to thereby push the valve member 40 to the unblocked position against the biasing force of the resilient member 50, such that another hydraulic fluid (B) introduced from the inlet through hole 15 is permitted to flow into the first space 11 via the second space 12 and to exit the first space 11 via the outlet through hole 311.

Referring back to FIG. 3, when a pump (not shown) pumping the hydraulic fluid (A) (see FIG. 4) is turned off, the valve member 40 is biased back to the blocked position by the resilient member 50, such that the hydraulic fluid (B) (see FIG. 4) cannot enter the first space 11 via the second space 12.

To sum up, since the abutment member 20 is made of a flexible material, the valve member 40, when being at the blocked position, is able to abut tightly against the abutment member 20 without being precisely machined. Therefore, the manufacturing cost of the check valve of this invention is lowered, and the fluid-tightness is enhanced so that the chuck can hold a work piece firmly.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A check valve adapted for use in a hydraulic system, comprising: a tubular casing extending along an axis and having a first inner surrounding surface that surrounds the axis and that defines a first space therein, a second inner surrounding surface that surrounds the axis and that defines a second space therein, and an annular first shoulder surface that interconnects said first and second inner surrounding surfaces; an abutment member made of a flexible material and having an annular section that clings to said first shoulder surface and that defines a central opening interconnecting said first and second spaces; a valve member disposed in said tubular casing and movable along the axis between a blocked position where said valve member blocks said central opening of said abutment member to isolate said first space from said second space, and an unblocked position where said valve member is spaced apart from said abutment member and is retained in said first space such that said first and second spaces communicate fluidly with each other; and a resilient member mounted to said tubular casing and biasing resiliently said valve member toward the blocked position; wherein, said central opening of said abutment member has a diameter greater than that of an opening that is defined by said first shoulder surface of said tubular casing such that when said valve member is at the blocked position, said valve member abuts against said annular section of said abutment member and said first shoulder surface of said tubular casing simultaneously; and wherein said abutment member further has a tubular section connected to said annular section and clinging to said first inner surrounding surface, wherein at least a portion of said resilient member is located within said tubular section of said abutment member.

2. The check valve as claimed in claim 1, further comprising an inner tubular piece having
   an end wall that is connected fixedly to an end of said first inner surrounding surface distal from said second space, and that is formed with an outlet through hole communicating with said first space, and
   a tubular wall that extends from said end wall toward said second space, said resilient member being configured as a compression spring, being disposed in said tubular wall, and being connected between said valve member and said end wall.

3. The check valve as claimed in claim 2, wherein:
   said tubular casing further has a third inner surrounding surface that surrounds the axis, that is disposed at a side of said second inner surrounding surface opposite to said first inner surrounding surface along the axis, and that defines a third space therein;
   said check valve further comprises
      an end piece that is connected fixedly to an end of said third inner surrounding surface distal from said second space for sealing up a distal end of said third space, and
      a piston member that is disposed in said tubular casing and that divides said third space into a driving space portion and a communicating space portion that is isolated from said driving space portion, said driving space portion being defined between said end piece and said piston member, said communicating space portion being defined between said piston member and said second space and communicating fluidly with said second space, said piston member being movable along the axis and having a rod portion that extends through said second space toward said first space to contact said valve member; and
   said tubular casing further has
      an inlet through hole that extends radially from said second space through a wall segment of said tubular casing, and
      a driving through hole that extends radially from said driving space portion of said third space through another wall segment of said tubular casing, said piston member being propelled toward said first space when a hydraulic fluid of the hydraulic system enters said driving space portion via said driving through hole, thereby pushing said valve member to the unblocked position against the biasing force of said resilient member and permitting another hydraulic fluid introduced from said inlet through hole to flow into said first space via said second space and to exit said first space via said outlet through hole.

4. The check valve as claimed in claim 1, wherein said abutment member has an opening-defining surface that defines said central opening, said opening-defining surface having an annular surface portion that contacts said valve member when said valve member is at the blocked position and that converges toward said second space.

* * * * *